United States Patent [19]
Onagi et al.

[11] Patent Number: 5,759,657
[45] Date of Patent: Jun. 2, 1998

[54] OPTICAL RECORDING MEDIUM AND DEVICE FOR REPRODUCING THE SAME

[75] Inventors: Nobuaki Onagi; Takanobu Higuchi, both of Tsurugashima, Japan

[73] Assignee: Pioneer Electronic Corporation, Tokyo-to, Japan

[21] Appl. No.: 685,768

[22] Filed: Jul. 24, 1996

Related U.S. Application Data

[63] Continuation of Ser. No. 147,946, Nov. 5, 1993, abandoned.

[30] Foreign Application Priority Data

| Nov. 9, 1992 | [JP] | Japan | 4-298274 |
| Apr. 19, 1993 | [JP] | Japan | 5-091051 |
| Oct. 7, 1993 | [JP] | Japan | 5-251980 |

[51] Int. Cl.$^6$ ................................................. G11B 5/66
[52] U.S. Cl. ............... 428/64.4; 428/64.6; 428/694 EC; 428/694 MM; 428/694 ML; 428/694 DE; 428/694 RL; 428/694 SC; 428/900; 369/13; 369/275.1; 369/275.2; 369/275.4; 369/788
[58] Field of Search .................. 428/694 EC, 694 MM, 428/694 ML, 694 DE, 694 RL, 694 SC, 900, 64.4, 64.6; 369/13, 275.1, 275.2, 275.4, 288

[56] References Cited

U.S. PATENT DOCUMENTS

| 4,932,012 | 6/1990 | Kobayashi | 369/13 |
| 5,168,482 | 12/1992 | Aratani et al. | 369/13 |
| 5,208,799 | 5/1993 | Nakao et al. | 369/110 |
| 5,241,520 | 8/1993 | Ohta et al. | 369/13 |
| 5,283,770 | 2/1994 | Nakao et al. | 369/13 |
| 5,335,220 | 8/1994 | Ohta et al. | 369/288 |
| 5,402,411 | 3/1995 | Maeda et al. | 369/275.1 |

FOREIGN PATENT DOCUMENTS 415449  3/1991  European Pat. Off.

OTHER PUBLICATIONS

Aratani et al (R) "Unique MO Disk Attains Super Resolution"; JEE No. 293; May 1991; pp. 74–76.

Fukami et al (R) "Direct Overwrite Technology Using EC Multilayers" J. Magn. Soc. Jpn., vol. 15 (Supplement); Aug. 1991; pp. 293–298.

Ohta et al (R) "Read Out Mechanism of MSR"; J. Magn. Soc. Jpn., vol. 15 (Supplement)(Sep. 1991) pp. 319–322.

Fujii et al (R) "Direct Overwrite and SR Readout by E C Multilayer Film"; J. Magn. Soc. Jpn., vol. 17 (Supplement) Jan. 1993; pp. 167–170.

*Primary Examiner*—Leszek Kiliman
*Attorney, Agent, or Firm*—Kane,Dalsimer,Sullivan, Kurucz, Levy, Eisele and Richard, LLP

[57] ABSTRACT

An optical recording medium includes: a substrate on which information is recorded as phase pits, and a polarization state varying layer for rotating a polarization state of a light beam irradiated thereon in accordance with a temperature distribution caused by irradiation of the light beam. A device for reproducing information recorded on the optical recording medium includes: light irradiation unit for irradiating a read-out light beam to produce a light spot on the optical recording medium so that a light intensity of the light beam at a first portion of the light spot is higher than a predetermined level, separation unit for separating a component of light beam having a predetermined polarization state from a light beam reflected by the optical recording medium, light receiving unit for receiving the light beam separated by said separation means and generating read-out signal, and reproducing unit for reproducing information recorded on the optical recording medium on the basis of the read-out signal.

22 Claims, 20 Drawing Sheets

F I G. 8A
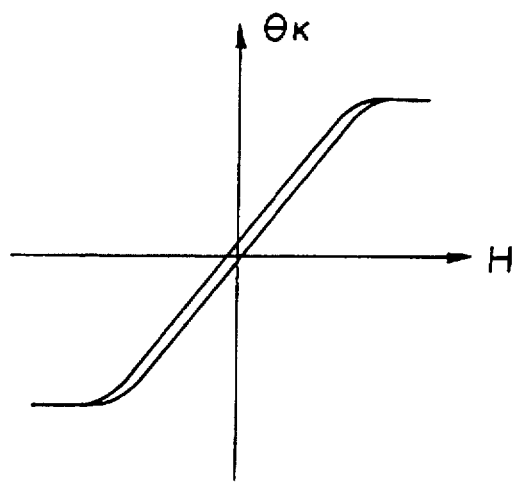
F I G. 8B
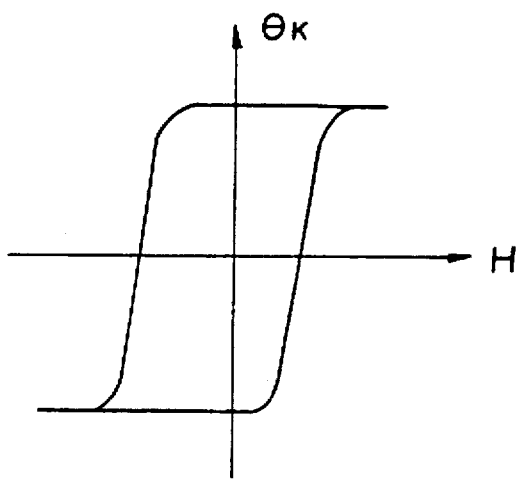

F I G. 10
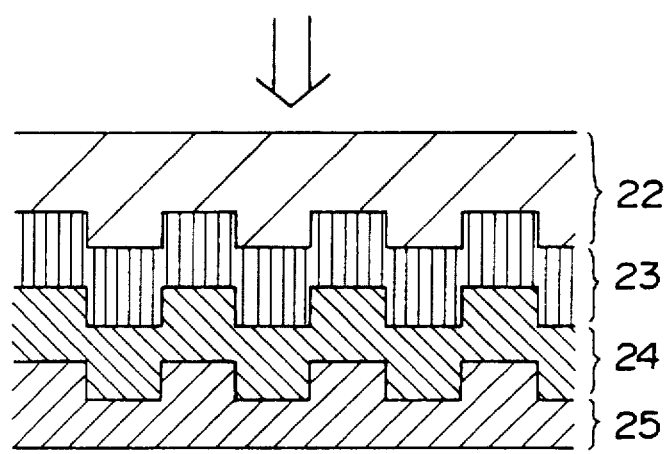

F I G.12
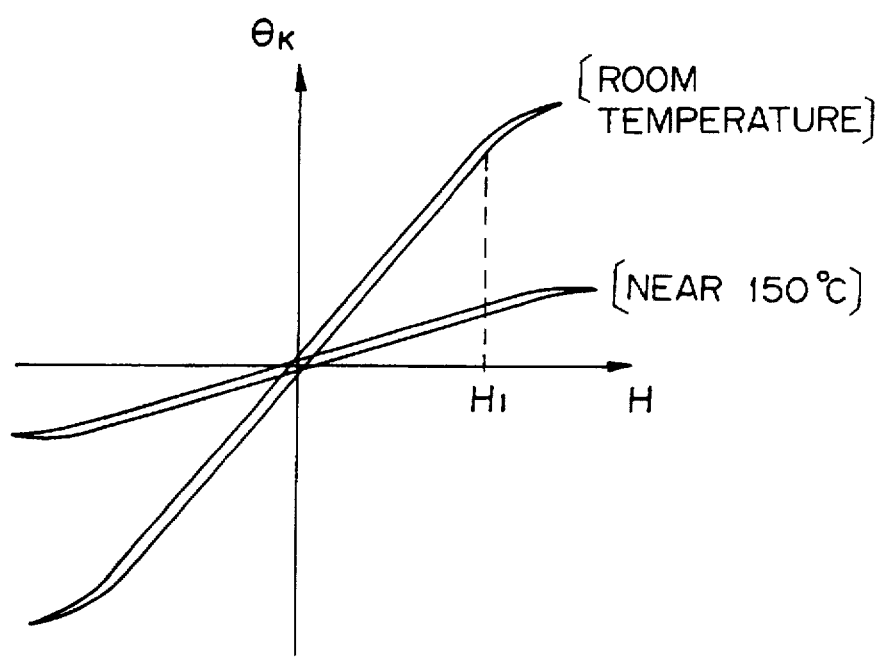

F I G. 14
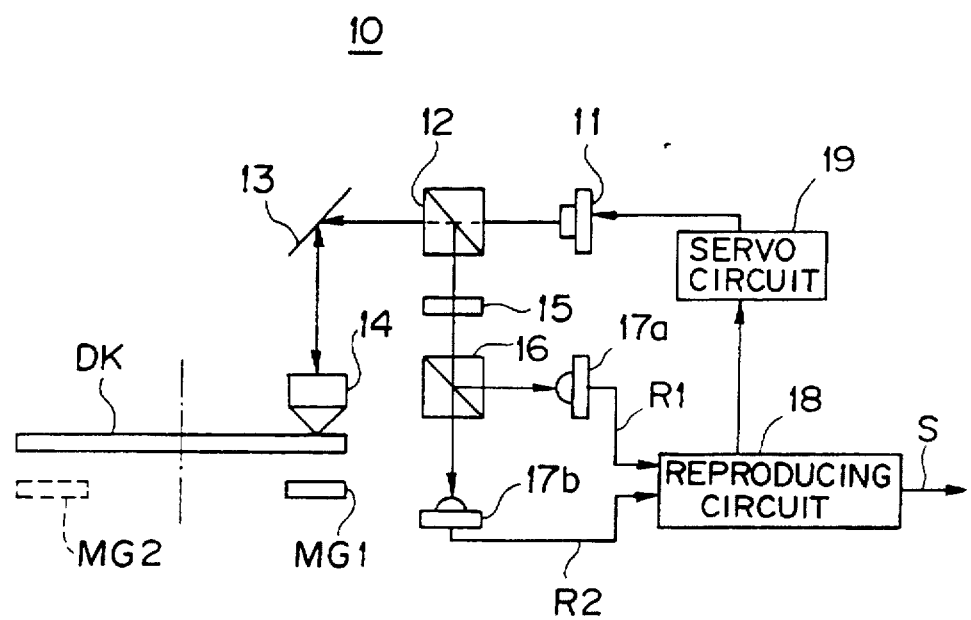

F I G. 15
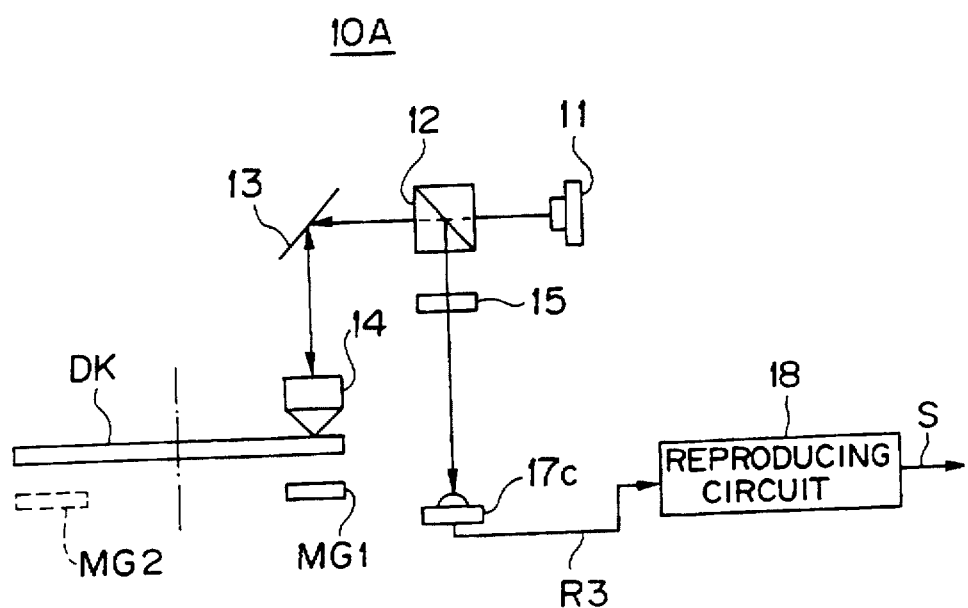

F I G. 16
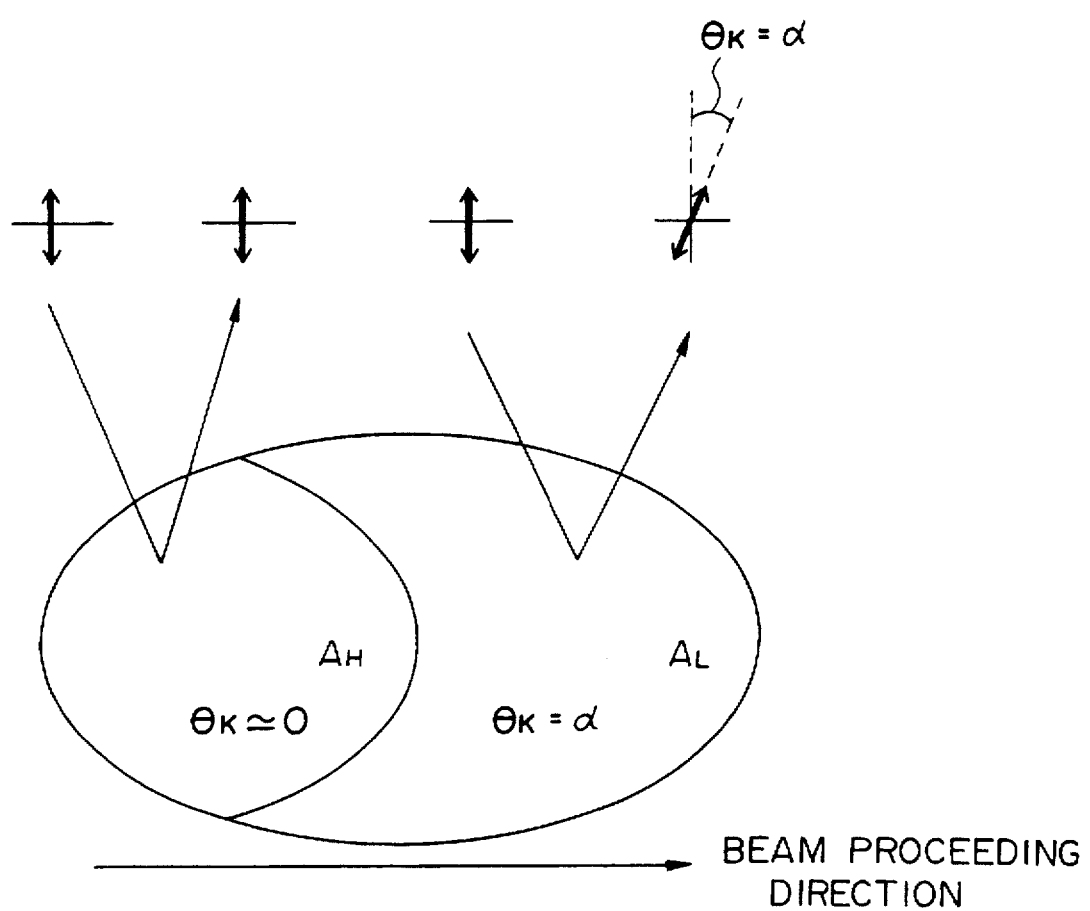

F I G. 17
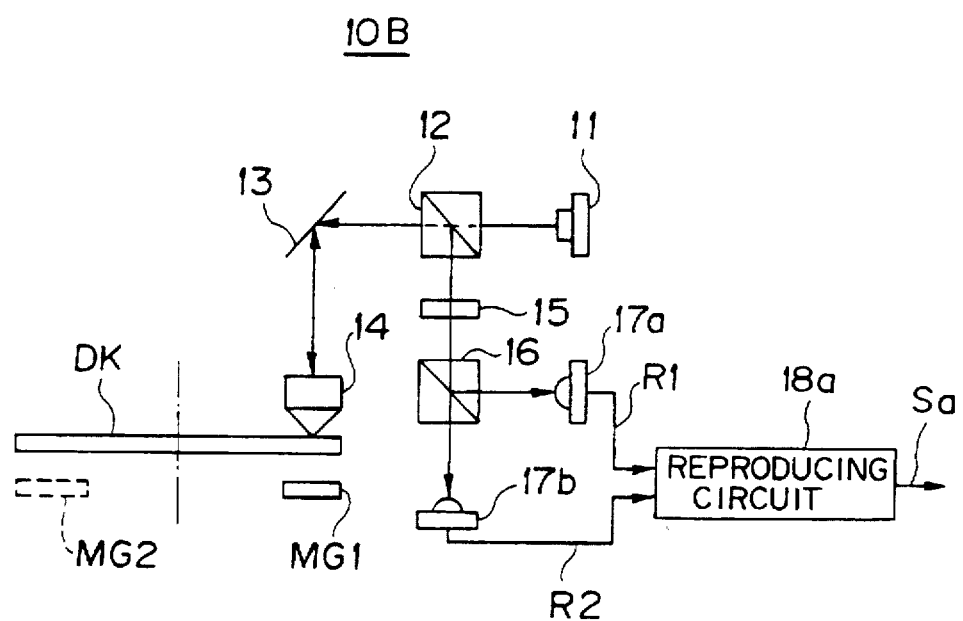

OPTICAL RECORDING MEDIUM AND DEVICE FOR REPRODUCING THE SAME

This application is a continuation of application Ser. No. 08/147,946, filed Nov. 5, 1993, now abandoned.

BACKGROUND OF THE INVENTION

1. Field of the Invention

This invention relates to an optical recording medium on which information is recorded with phase-pits, and a device for reproducing information from the optical recording medium. More particularly, this invention relates to an optical recording medium which records thereon information a with space frequency higher than a general space frequency which is specified by wavelength of a read-out light and numerical aperture of an objective lens, and a device for reproducing information from the optical recording medium.

2. Description of Related Art

As shown in FIGS. 1A and 1B, in order to reproduce information from an optical disc such as a CD (Compact Disc), an LD (Laser Disc) or the like, a read-out laser light is irradiated to pits P (phase pits) to detect reduction in quantity of reflected light which occurs due to diffraction, scattering or variation of optical constant of the pit, whereby information corresponding to presence or absence of the pits is obtained. More specifically, when the spot of the read-out laser light is irradiated onto the pit, as shown in FIG. 1A, the quantity of return light which is reflected due to scattering or the like is small. On the other hand, when the spot of the read-out laser light is irradiated in a gap between pits, i.e., off the pit as shown in FIG. 1B, the quantity of the return light is large. Information recorded on the optical disc is read out using the difference in quantity of the return light as described above.

In such cases, a reproduction resolution of the optical disc is restricted by the wavelength $\lambda$ of the read-out laser light and the numerical aperture NA, and therefore information having space frequency higher than the space frequency $fc=2NA/\lambda$ cannot be reproduced.

SUMMARY OF THE INVENTION

An object of this invention is to provide an optical recording medium capable of recording information with a space frequency higher than the space frequency $fc=2NA/\lambda$, specified by the wavelength $\lambda$ of a read-out laser light and the numerical aperture NA of an objective lens, and a device for reproducing information from the optical recording medium.

According to one aspect of the present invention, there is provided an optical recording medium including: a substrate on which information is recorded as phase pits, and a polarization-state varying layer for rotating a polarization state of a light beam irradiated thereon in accordance with a temperature distribution caused by irradiation of the light beam.

According to another aspect of the present invention, there is provided a device for reproducing information from an optical recording medium. The optical recording medium includes: a substrate on which information is recorded as phase pits, and a polarization state varying layer for rotating a polarization state of a light beam irradiated thereon in accordance with a temperature distribution caused by irradiation of the light beam. The device includes: light irradiation unit for irradiating a read-out light beam to produce a light spot on the optical recording medium so that a light intensity of the light beam at a first portion of the light spot is higher than a predetermined level, separation unit for separating a component of light beam having a predetermined polarization state from a light beam reflected by the optical recording medium, light receiving unit for receiving the light beam separated by said separation means and generating read-out signal, and reproducing unit for reproducing information recorded on the optical recording medium on the basis of the read-out signal.

The nature, utility and further features of this invention will be more clearly apparent from the following detailed description with respect to preferred embodiments of the invention when read in conjunction with the accompanying drawings briefly described below.

BRIEF DESCRIPTION OF THE DRAWINGS

FIGS. 8A and 8B are schematic diagrams showing an operation of a third embodiment;

FIG. 10 is a cross-sectional view showing the detailed structure of an optical disc of a fifth embodiment;

FIG. 12 is a schematic diagram showing the relationship between a coercive force H and a Kerr rotational angle of $Nd_{40}(Fe_{70}Co_{30})$ (90 nm thickness);

FIG. 14 is a schematic diagram showing the construction of a main portion of an optical disc reproducing device of a seventh embodiment;

FIG. 15 is a schematic diagram showing the construction of a main portion of an optical disc reproducing device of an eighth embodiment;

FIG. 16 is a schematic diagram showing the operation of the eighth embodiment;

FIG. 17 is a schematic diagram showing the construction of a main portion of the optical disc reproducing device of a ninth embodiment;

DETAILED DESCRIPTION OF THE PREFERRED EMBODIMENTS

Preferred embodiments according to this invention will be hereunder described with reference to the accompanying drawings.

First Embodiment

Figure 1A:
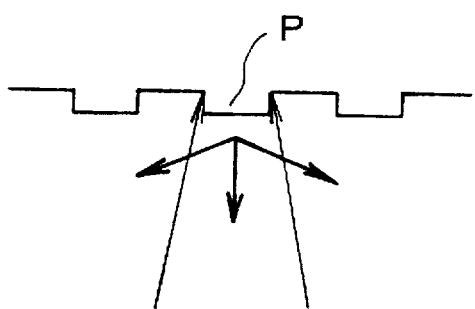
FIGS. 1A and 1B are schematic diagrams showing an information read-out principle.
Figure 1B:
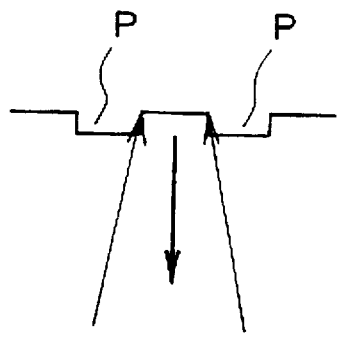
Figure 2A:
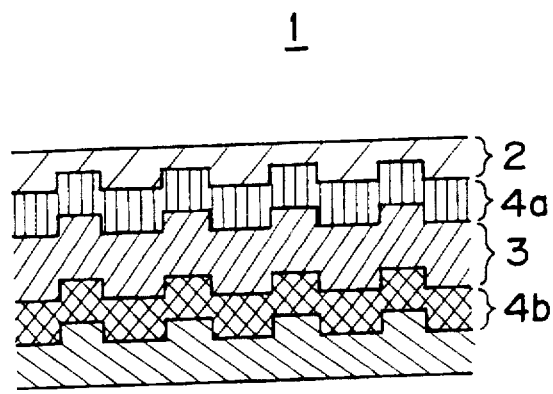
FIGS. 2A and 2B are cross-sectional views showing the detailed structure of an optical disc of a first embodiment.
Figure 2B:
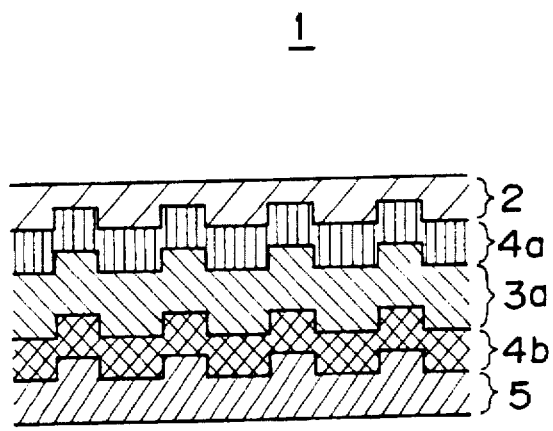

FIGS. 2A and 2B are cross-sectional views of an optical disc according to this embodiment. As shown in FIG. 2A, the optical disc includes a substrate 2 on which phase pits are formed, a material layer 3 serving as a polarization state varying layer for rotating a polarization state of a linearly-polarized read-out light incident to the layer in accordance with a temperature distribution caused by the irradiation of the read-out light, and protection layers 4a and 4b for protecting the material layer 3. In the following description, the combination of the material layer 3, the protection layer 4a and the protection layer 4b is referred to as a magneto-optical layer.

More specifically, the optical disc 1 is so designed that an ZnS layer 4a (85 nm thickness) serving as a dielectric protection layer, a TbFe layer 3 (80 nm thickness) serving as a material layer having magneto-optical effect, and an ZnS layer 4b (30 nm thickness) serving as a dielectric protection layer are formed on the substrate 2 in this order. The thickness values in parentheses are represented as one examples. In this case, the rotation of the polarization state is mainly caused by Kerr effect.

The optical disc as shown in FIG. 2A does not need a reflection layer because the TbFe layer 3 serving as the material layer has high reflectivity. However, when a magneto-optical layer having low reflectivity is used as a reflection-type optical disc 1, a reflection layer 5 as shown in FIG. 2B is required. Al, Au or the like is preferably used for the reflection layer 5. In this case, the rotation of the polarization state is mainly caused by Faraday effect.

More specifically, the optical disc 1 is so designed that an ZnS layer 4a serving as a dielectric protection layer, a Bi-replaced DyFe garnet layer 3a serving as a material layer having magneto-optical effect, an ZnS layer 4b serving as a dielectric protection layer, and an Al layer 5 serving as a protection and reflection layer are formed on the substrate 2 in this order.

The reproducing principle of the magneto-optical disc in this embodiment will be next described.

Figure 3A:
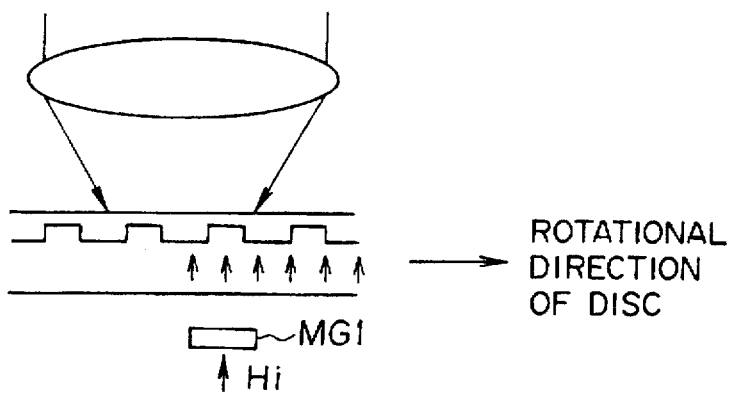
FIGS. 3A to 3C are schematic diagrams showing the reproducing principle of optical discs of first and second embodiments.
Figure 3B:
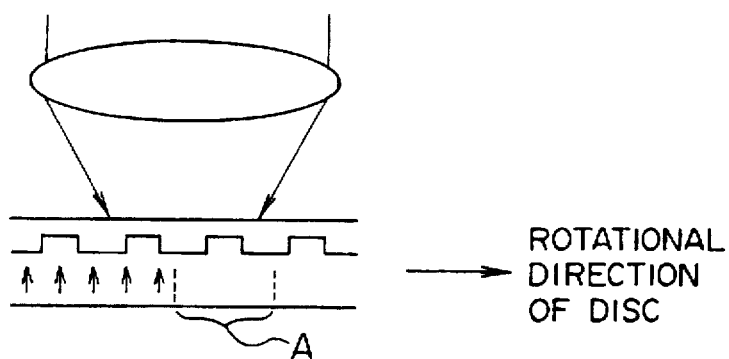

In an initial state as shown in FIG. 3A, the magneto-optical layer of the magneto-optical disc is magnetized by magnetizing device MG1 such as a permanent magnet so that all regions of the magneto-optical layer have the same vertical magnetizing direction (upward direction in FIG. 3A). In a reproducing operation, a light beam whose light intensity is adjusted is irradiated onto the magneto-optical disc as shown in FIG. 3B. In this case, when the temperature of an area A which is a part of a light spot to which the light beam is irradiated is increased to the Curie point temperature or more, the magnetic domain of the area A is extinguished. As a result, no variation is made to the polarization state of the read-out light in the area A having the magnetic domain extinguished. Accordingly, with respect to the area A, a reproducing light having the same polarization state as the incident read-out light can be detected by a detector. With respect to areas other than the area A within the light spot, the polarization state of the read-out light is rotated by a predetermined angle (θ) dependent on the material layer by the magneto-optical effect such as the Kerr effect, the Faraday effect or the like. Accordingly, a reproducing (reflected) light having a different polarization state from that of the incident read-out light is detected by the detector.

Accordingly, if these two kinds of reproducing lights having different polarization states are separated using separation device such as a polarizing filter, a differential optical system or the like, pit information existing partially in the read-out light spot can be selectively detected. This is optically equivalent to that a pin hole having smaller aperture than the diameter r of the read-out light spot which is defined by the wavelength λ of the read-out light and the numerical aperture NA is formed on the information recording surface of the optical disc, so that plural fine-size phase pits existing in the read-out light spot, that is, phase pits having high space frequency f (f>fc) can be reproduced.

Figure 4:
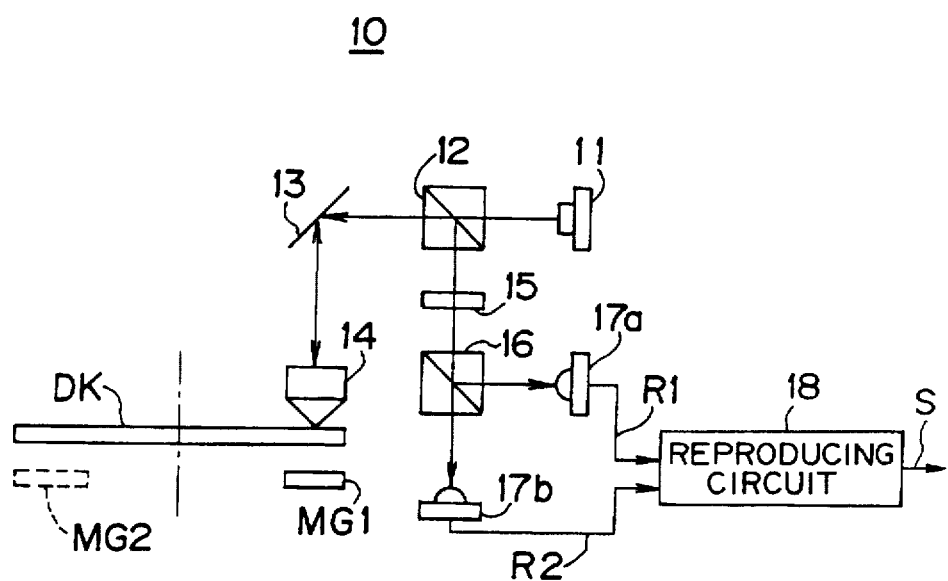
FIG. 4 is a schematic diagram showing a main portion of an optical disc reproducing device of a first embodiment.

FIG. 4 is a schematic diagram showing the construction of a main part of an optical disc reproducing device.

The optical disc reproducing device 10 includes a laser diode 11 for emitting a laser beam serving as a read-out light beam, a beam splitter 12 for passing the incident laser beam therethrough and reflecting a laser beam incident from a mirror, a mirror 13 for guiding the laser beam, an objective lens 14 for converging the laser beam on information recording surface of the optical disc DK, a half-wave plate 15 for adjusting the ratio of the reflected-light quantity and the transmitted-light quantity, at a position of polarizing beam splitter, of a light beam from non-read-out regions of the reproducing light reflected from the beam splitter 12, a polarizing beam splitter 16 for passing therethrough only a polarized light having a predetermined polarization state and reflecting other lights, a first light-receiving element 17a for receiving the polarized light reflected from the polarizing beam splitter 16 and outputting it as a first read-out signal (RF signal) R1, a second light-receiving element 17b for receiving a polarized light transmitted through the polarizing beam splitter 16 and outputting it as a second read-out signal R2, a reproducing circuit 18 containing a decoder, an amplifier, etc. for converting the read-out signals R1 and R2 to a reproduced signal S and outputting the reproduced signal S, and a magnet MG1 for aligning the vertical magnetization direction of the optical disc DK in a predetermined direction (hereinafter referred to as "initialization").

Next, the operation of this embodiment will be described with reference to FIGS. 3A to 3C.

Figure 3C:
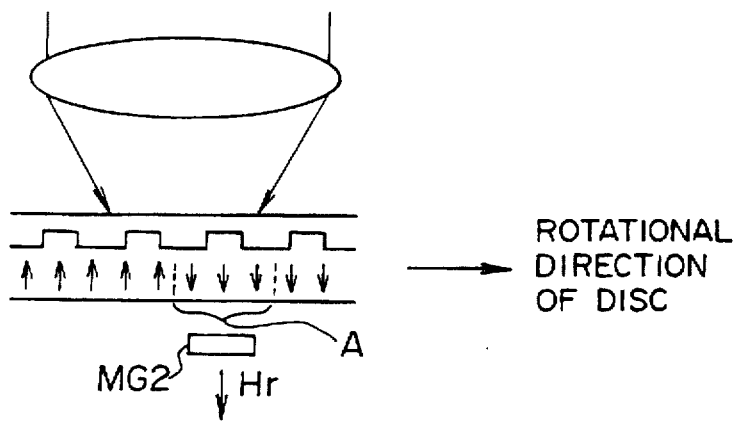

An external magnetic field Hi is applied to the magneto-optical layer of the optical disc DK using the magnet MG1 to align in a predetermined direction the vertical magnetization direction before a recorded information read-out operation (initialization: upward direction in FIGS. 3A to 3C). In this case, a second magnet MG2 may be provided to carry out the initialization just before the read-out of the recorded information in a reproducing operation. Further, if occasion demands, it may be adopted that the vertical magnetization direction of all regions of the optical disc DK is initialized using the magnet MG1, then the vertical magnetization direction for the read-out is inverted using the magnet MG2, and then it is initialized using the magnet MG1 again.

Here, the case where the vertical magnetization direction of all regions of the optical DK is beforehand initialized by the magnet MG1 will be described.

Figure 5A:
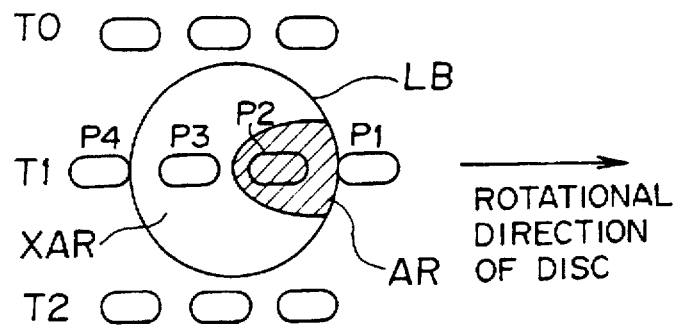
FIGS. 5A to 5C are schematic diagrams showing the reproducing principle of the first embodiment.
Figure 5B:
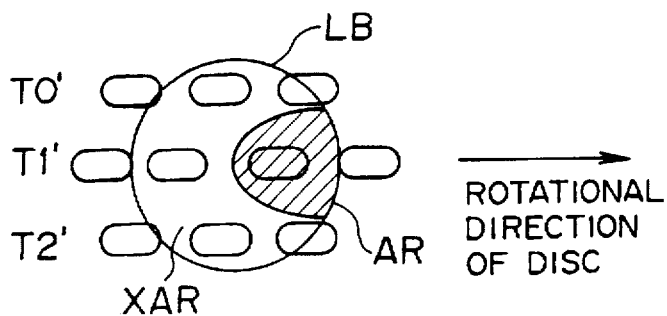

The spot of the read-out light (laser beam) LB is focused through the beam splitter 12, the mirror 13 and the objective lens 14 onto the information recording surface of the optical disc DK to form the read-out spot LB on a track T1 as shown in FIG. 5A, and the read-out spot LB is moved on the track T1 according to an rotation of the disc DK. On the track T1 are formed phase pits having a space frequency f (f>fc) higher than a space frequency fc=2NAλ which is defined by the wavelength λ of the read-out light and the numerical aperture NA. Specifically, plural phase pits P2 and P3 exist in the read-out spot LB, but the information of these phase pits P2 and P3 cannot be separated with no treatment, so that the reproducing operation cannot be surely performed. Likewise, the same problem (that is, the accurate reproducing operation cannot be performed) occurs in the case where plural tracks T0, T1 and T2 are contained in the read-out light spot LB as shown in FIG. 5B.

Figure 5C:
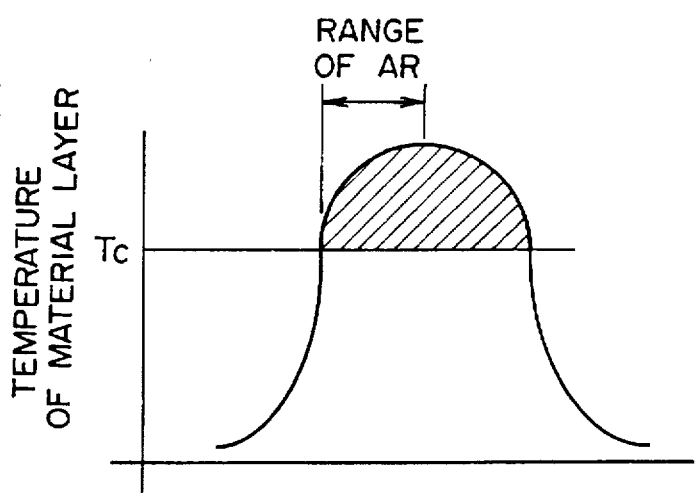

In order to solve the above problem, by adjusting the output intensity of the read-out light, the temperature of the material layer is increased above the Curie temperature at an area AR which corresponds to a rear portion of the read-out spot LB as shown in FIG. 5C, and in a case as shown in FIG. 5A, the magnetic domain of the area AR where the phase pit P2 exists is extinguished. As a result, in the area AR where the magnetic domain has extinguished, the reproducing light which is a reflected by the information recording surface is returned to the light-receiving element side while keeping its polarization state the same as that of the read-out light irradiated. On the other hand, in an area XAR which is the other area than the area AR in the read-out light and contains the phase pit P3, the reproducing light is returned to the light-receiving element side while its polarization state is rotated with respect to the polarization state of the read-out light by an angle θk due to the magneto-optical effect of the material layer. The reproducing lights from the areas AR and XAR reach the light-receiving elements 17a and 17b in composite state. However, if the quantity of the reproducing light from the area XAR is set so as to be incident to each of the first and second light-receiving elements 17a and 17b in equi-quantity by adjusting the halfway plate 15 or the like, the signal components of the reproducing light from the area XAR are offset by differentiating (calculating a differential output between) the first and second read-out signals R1 and R2, and thus the area XAR is apparently shielded. Accordingly, in the reproducing circuit 18, only information of the area AR, that is, the phase pit P2 can be read out, and thus the reproduced signal S contains only information of the phase pit P2.

As described above, according to the first embodiment, information having the space frequency f higher than the space frequency fc (=2NA/λ) which is defined by the wavelength λ of the read-out light and the numerical aperture NA of the objective lens 14 can be reproduced.

Further, for a continuous reproducing operation, an external magnetic field Hi may be applied by the magnet MG1 in the reproducing operation to set the vertical magnetization direction to that of the initialization state in a process where the area AR is cooled, or a second magnet may be provided to carry out a re-initialization after the information read-out operation. Still further, the optical system of the above embodiment is equivalent to a recording and reproducing device for a rewritable type of magneto-optical disc which has been currently widely used, and thus the device can be commonly used.

Still further, according to this invention, the area to be apparently shield can be set by adjusting the half-wave plate 15 or the like. Therefore, even when an used optical disc is an optical disc of high density not only in a pit array direction but also in a track pitch direction, occurrence of an inter-track cross-talk and an inter-pitch cross-talk can be reduced or neglected, and thus information of only desired phase pits can be accurately reproduced.

Second Embodiment

The first embodiment is directed to the case where the magnetic domain of one of the areas within the read-out light spot is extinguished. In the second embodiment, as shown in FIG. 3C, the magnetization direction of the area A is inverted compared with that of the initial state (see FIG. 3A) by the magnetizing device MG2 such as a permanent magnet or the like. In this case, the angular difference between the polarization states of the reproduced lights from the area A and the other area in the read-out light spot is two times (=2×θ) as large as the case of FIG. 3B (first embodiment), and thus the two kinds of the reproduced lights having different polarization states can be more easily separated. In addition, the intensity of the reproduced signal can be improved.

[Example of Experiment]

An experiment which was actually carried out using an optical disc will be next described.

The construction of a prototype optical disc and measurement conditions are as follows:

(1) pit length: 0.3 μm (2) track pitch: 1.6 μm (3) construction of material layer and thickness:
protection layer (substrate side, ZnS): 85 nm
magneto-optical material layer (TbFe): 80 nm
protection layer (ZnS): 30 nm (4) numerical aperture NA of objective lens: 0.55

(5) wavelength λ of laser beam: 825 nm (6) linear velocity: 5.4 m/sec

Figure 6:
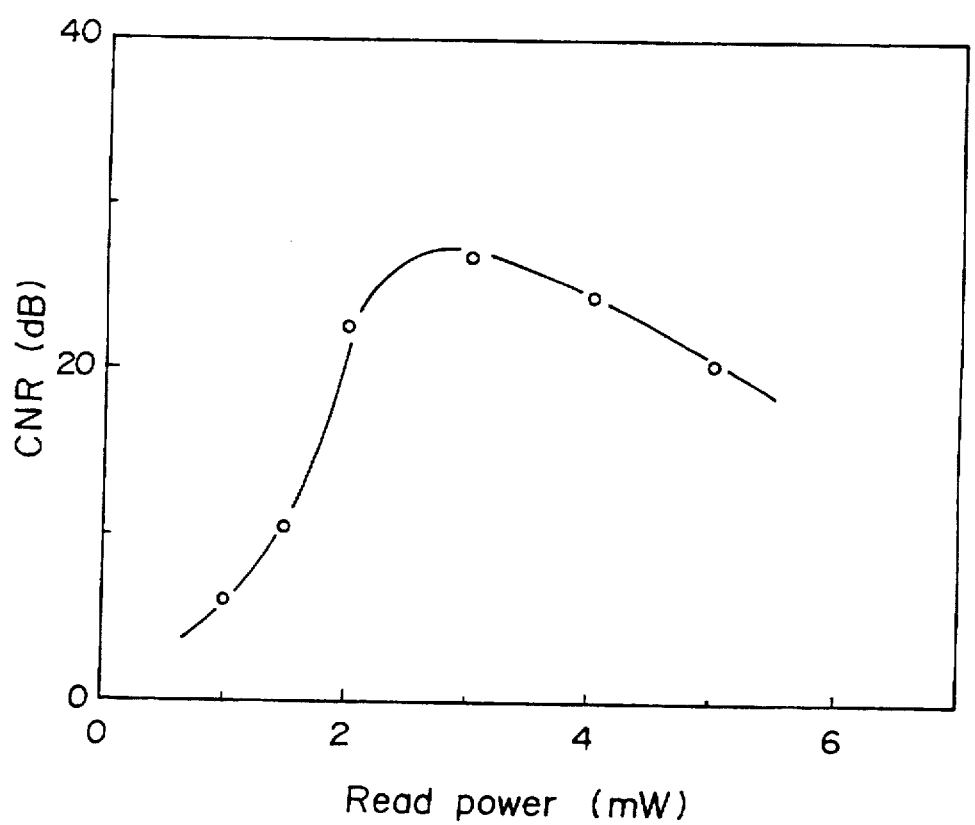
FIG. 6 is a graph showing a result of a reproducing experiment.

In the experiment, the whole optical disc was beforehand initialized, and then a differential output was obtained using the output of the reproducing laser beam as a parameter to measure C/N (Carrier to Noise ratio). At this time, no external magnetic field was applied. This result is shown in FIG. 6.

The pit length which corresponds to the limit of the reproducing resolution of the optical system is 0.375 μm, and the application of this invention enables detection of the information of fine-size phase pits, that is, phase pits having high space frequency which has been conventionally impossible using a conventional reproducing method.

In the first and second embodiments as described above, TbFe is used as the material layer of magneto-optical recording medium, however, other magneto-optical recording materials such as TbFeCo, GdTbFe, NdFe, NdFeCo, TbNdFeCo, GdGa garnet, Bi-replaced DyFe garnet, Pt/Co artificial lattice thin film, Pd/Co artificial lattice thin film, a multi-layer of these elements or the like may be used.

Third Embodiment

The first and second embodiments use as the magneto-optical recording material the Curie point recording material whose magnetic domain is extinguished at a temperature above the Curie temperature Tc. However, this third embodiment uses a compensation point recording material whose coercive force is rapidly increased at a compensation point temperature Tcomp. As the magneto-optical recording material is used GdCo-group material, GdFeCo-group material or the like. As a more specific example, the case where $Gd_{28}(Fe_{90}Co_{10})_{72}$ is used will be described.

Figure 7A:
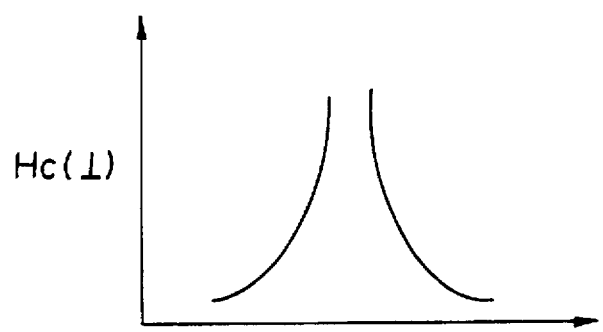
FIGS. 7A and 7B are graphs showing vertical coercive force Hc ($\perp$) of $Gd_{26}(Fe_{90}Co_{10})_{74}$ wherein the abscissa represents temperature.
Figure 7B:
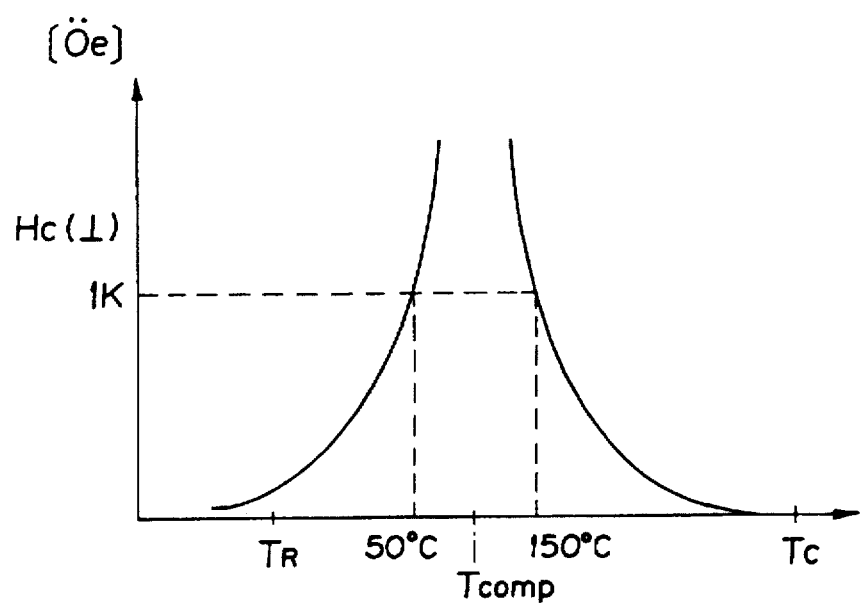

FIGS. 7A and 7B are graphs showing the vertical coercive force Hc (⊥) of $Gd_{28}(Fe_{90}Co_{10})_{72}$ where the abscissa represents temperature. The vertical coercive force Hc (⊥) of $Gd_{28}(Fe_{90}Co_{10})_{72}$ is larger than 1 k Oersted in the temperature range of 50° C. to 150° C. At a room temperature $T_R$, it is substantially equal to zero Oersted.

As a result, if the output power of the light beam is so set that the high-temperature portion within the light spot is at a temperature in the range of 50° C. to 150° C., the Kerr rotational angle θk in the high-temperature portion as shown in FIG. 8B is extremely larger than the Kerr rotational angle θ in a low-temperature portion as shown in FIG. 8A (=equal to substantially zero). Therefore, by selectively reading out only information of the area having the larger Kerr rotational angle θk using the optical system, information having higher space frequency can be read out, and by narrowing the pitch in the track direction, information which is recorded in higher density can be reproduced.

Fourth Embodiment

The third embodiment is directed to the case where the area within the optical spot is divided into two areas using the compensation point recording material. In this fourth embodiment, by using the compensation point material and intensifying the light beam or using an elliptical light spot, the area within the light spot is divided into three areas to thereby enable reproduction of information having further higher space frequency.

Figure 9A:
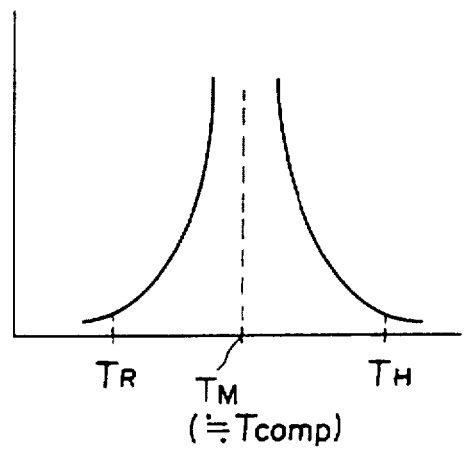
FIGS. 9A and 9B are schematic diagrams showing an operation of a fourth embodiment.
Figure 9B:
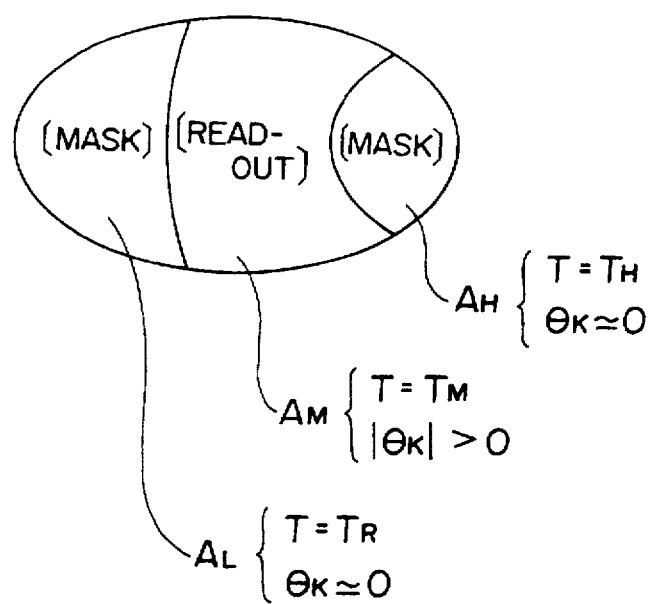

In the case where an optical disc is formed of a compensation point recording material of GdFeCo group or the like, it is required to stably keep the temperature in a narrow temperature range for the reproducing operation. Accordingly, in this case, there occurs a problem that it is difficult to carry out control. Accordingly, in this fourth embodiment, as shown in FIG. 9A, the output power of the light beam is increased so that a temperature distribution within the light spot becomes a wide-range temperature distribution over regions above and below the compensation temperature Tcomp. In addition to or in place of the above operation, an elliptical light beam is irradiated onto the optical disc so that its longer axis direction corresponds to the track direction, and the middle region of the light beam is set at a temperature near the compensation temperature Tcomp (see FIG. 9A).

As a result, the kerr rotational angle θk of the intermediate-temperature region $A_M$ of the light spot (temperature=$T_M$) is increased in the same manner as shown in FIG. 8B, and the Kerr rotational angle $θ_K$ of the low-temperature region $A_L$ (temperature T=$T_R$) and the high-temperature region $A_H$ (temperature=$T_H$) is substantially equal to zero. Accordingly, if the optical system is so designed that only a reflected light from a portion having larger Kerr rotational angle $θ_K$ is received, only the intermediate-temperature region can be set as a read-out region, and information of only the read-out region can be reproduced, so that recording information having further higher space frequency can be reproduced.

Fifth Embodiment

In the first embodiment, a magnetic field is required to be applied for reproduction of recorded information. However, in the fifth embodiment, such a magnetic field is not required for the reproduction if the initialization is carried out only once after the optical disc is formed.

As shown in FIG. 10, the optical disc includes a substrate 22 on which phase pits are formed, a material layer 23 serving as a polarization state varying layer for rotating the polarization state of an incident linearly-polarized read-out light in accordance with the temperature distribution caused by irradiation of the read-out light, a reproducing magnetic field applying layer 24 for applying a reproducing magnetic field, and a protection layer 25 for protecting the reproducing magnetic field applying layer 24.

The specific construction of the optical disc is as follows. The material layer 23 is formed of compensation point material such as GdFeCo, GdCo or the like, in which the vertical coercive force Hc($\perp$) at the room temperature is substantially equal to zero and that in the read-out temperature range is larger than or equal to b 1k Oersted. The reproducing magnetic field applying layer 24 is formed of Curie point material such as TbFeCo, DyFeCo or the like which always becomes a vertically magnetized film at a temperature below 150° which is the maximum temperature of the read-out temperature.

As a result, an exchange interaction and an magneto-static coupling force act between the material layer and the reproducing magnetic field applying layer, so that the reproducing magnetic field applying layer acts on the material layer to direct the magnetization direction of the material layer in the vertical direction. Accordingly, it is not necessary to apply the reproducing magnetic field in the reproducing operation, and thus the construction of the reproducing device can be simplified.

Sixth Embodiment

In the first to fifth embodiments, the read-out operation of information is carried out using the vertically magnetized film. However, for the vertically magnetized film, the Kerr rotational angle $θ_K$ tends to be reduced for a blue-color beam laser whose beam spot diameter can be more reduced. More specifically, as shown in FIG. 11, it is apparent that the Kerr rotational angle $θ_K$ of $Tb_{28}(Fe_{90}Co_{10})_{72}$ (100 nm thickness) is more reduced as the wavelength is shortened.

In this embodiment, the reproduction of high-density recording information can be carried out using the fact that for a specific in-plane magnetized film, the Kerr rotational angle $θ_K$ of an area which is vertically magnetized by applying an external magnetic field is increased for a read-out light having short wavelength. For example, the Kerr rotational angle $θ_K$ of $Nd_{20}Fe_{40}Co_{40}$ is shown in the upper side of FIG. 11 when a magnetic field of ±10 K Oersted is applied.

Figure 11:
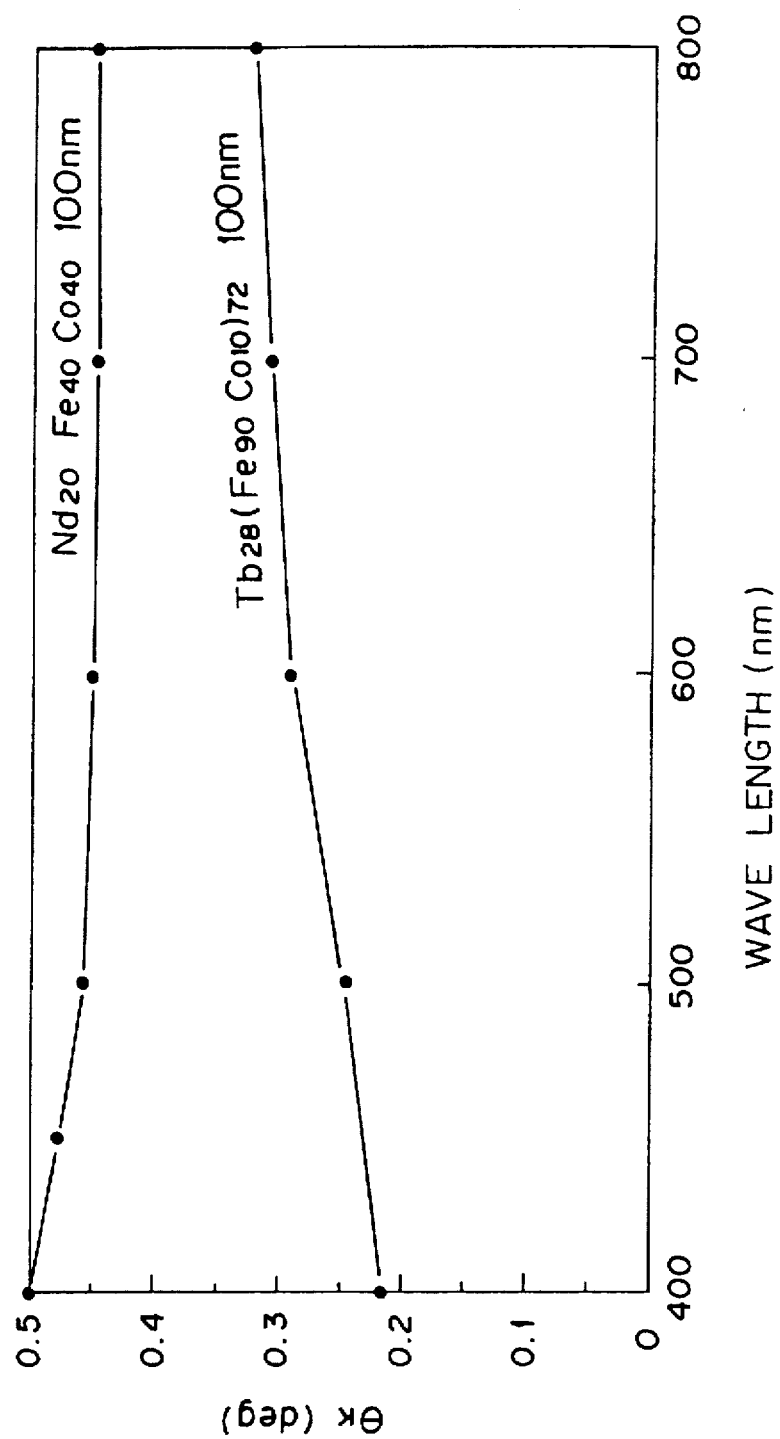
FIG. 11 is a graph showing the principle of a sixth embodiment.

As shown in FIG. 11, it is apparent that the Kerr rotational angle $θ_K$ of $Nd_{20}Fe_{40}Co_{40}$ is increased at the short-wavelength region. Curie point materials such as NDFeCO group, PtCo group, PtMnSb (Heusler's alloy), etc. are cited as a material later having the above characteristic. More specifically, when the material layer is formed of $Nd_{40}$ ($Fe_{70}Co_{30}$) in about 90 nm thickness, the relationship between the applied magnetic field H and the Kerr rotational angle is shown in FIG. 12. At the same applied magnetic field $H_1$, the Kerr rotational angle $θ_K$ is larger at the room temperature than at a temperature near 150° C., that is, the low-temperature region in the beam spot has larger Kerr rotational angle $θ_K$.

Figure 13:
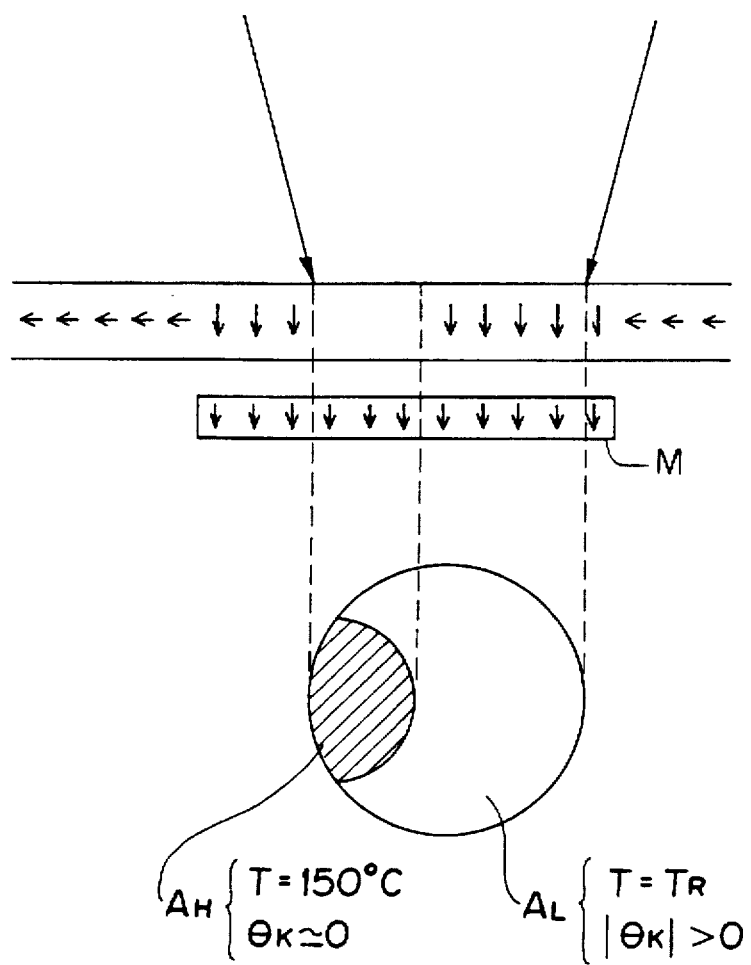
FIG. 13 is a schematic diagram showing the reproduction state of a sixth embodiment.

As shown in FIG. 13, if an external magnetic field is applied to a broad region containing the beam spot area by magnetizing device M and the optical system is so designed that information of an area $A_L$ (temperature T=room temperature $T_R$) having large Kerr rotational angle $θ_K$ as shown in FIG. 13 is read out, recording information having a higher space frequency than a space frequency defined by the beam diameter can be reproduced.

Seventh Embodiment

When a compensation point recording material film of GdFeCo-group is used as a reflection and mask generation film like the third embodiment, the high-temperature portion is used as the read-out region. However, the temperature at which the vertically magnetized state is produced is greatly varied in accordance with the composition of the layer. Further, when the read-out region is narrowed, the temperature of the material film is required to be stably kept in a narrow temperature range. The information pits are recorded as phase pits on the optical disc, and the information is never erased even if the output power of the read-out light in the reproducing operation is highly increased.

In view of the foregoing, if a servo circuit 19, as shown in FIG. 14, constituting a negative feedback is provided to control the output power of a laser diode for emitting the read-out light in accordance with the output signal level of an amplifier for amplifying the output signal of an optical pick-up, the deviation of the optimum reproducing temperature due to dispersion of the composition of the optical disc or the like is corrected to surely reproduce the information. In this case, the servo period may be set to 30 Hz or less (a long period above one rotational time) for an optical disc having rotating rate of 1800 rpm. As a result, the manufacturing condition for the optical disc is moderated. In addition, it is easily performed to follow the temperature variation in the optical reproducing device during use of the device.

Eighth Embodiment

In the optical disc reproducing device of the first embodiment as described above, the reproduction of the recording information is carried out using the differential optical system having two light-receiving elements. However, in this eighth embodiment, the optical system is constructed by one light-receiving element.

FIG. 15 shows the construction of the main part of the optical disc reproducing device of the eighth embodiment. The same elements as the first embodiment are represented by the same reference numerals, and the detailed description thereof is omitted. The optical disc reproducing device 10A includes a laser diode 11 for emitting a laser beam serving as a read-out light, a beam splitter 12 for passing therethrough the laser beam emitted from the laser diode 11 and reflecting a laser beam emitted from a mirror as described later, a mirror 13 for guiding the laser beam, an objective lens 14 for focusing the laser beam on the information recording surface of the optical disc DK, a polarizing plate for passing therethrough only a laser beam from a read-out region of the laser beam (reproducing light) reflected from the beam splitter 12, a light-receiving element 17c for receiving the polarized light transmitted from the polarizing plate to output it as a read-out signal R3 (RF signal), and a reproducing circuit 18 having a decoder, an amplifier, etc. for converting the read-out signal R3 to a reproduced signals.

The operation of the reproducing device will be next described.

The laser beam emitted from the laser diode 11 is transmitted through the beam splitter 12, reflected from the mirror 13 and focused through the objective lens 14 onto the information recording surface of the optical disc DK. The state of the optical disc DK within the beam spot at this time is shown in FIG. 16. That is, an area located at a front side in the proceeding direction of the beam is a low-temperature area $A_L$ and the Kerr rotational angle $\theta_K$ thereof is equal to $\alpha$ ($\alpha$:substantially constant). On the other hand, an area at a rear side in the proceeding direction of the beam is a high-temperature area $A_H$ and the Kerr rotational angle $\theta_K$ is equal to zero.

Accordingly, if the polarizing plate 15 is so set as to pass therethrough light having the same polarization state of the incident light from the laser diode side, the reflected light from the low-temperature area $A_L$ is hardly transmitted through the polarizing plate 15. In this case, only the reflected light (Kerr rotational angle $\theta_K=0$) from the high-temperature area $A_H$ is transmitted through the polarizing plate 15, and received by the light-receiving element 17c. This received light is converted to the reproduced signal and outputted by the reproducing circuit 18. That is, the low-temperature area $A_L$ serves as a mask area, and the high-temperature area $A_H$ serves as a read-out area. Accordingly, the recording density can be also improved in the track pitch direction, and the recording information having further higher space frequency can be reproduced.

Ninth Embodiment

For the optical disc which is highly densified in the track pitch direction, in order to reduce a cross-talk and obtain an excellent reproduced signal, the mask area is required to be inverted to the read-out area in the rewritable type of magneto-optical disc reproducing device, and thus adjustment of the half-wave plate is required. Therefore, it is difficult to use such an highly-densified optical disc with the optical system of the conventional rewritable type of magneto-optical disc reproducing device.

In view of the foregoing, in this embodiment, the optical system is common to the optical system of the rewritable type of magneto-optical disc reproducing device, and the read-out operation can be carried out for an optical disc which is highly densified in the track pitch direction by a signal processing.

FIG. 17 shows the construction of the main part of the optical disc reproducing device of the ninth embodiment.

The optical disc reproducing device 10B includes a laser diode 11 for emitting a laser beam serving as a read-out light, a beam splitter 12 for passing an incident laser beam therethrough and reflecting a laser beam incident from a mirror as described later, a mirror 13 for guiding the laser beam, an objective lens 14 for focusing the laser beam on the information recording surface of the optical disc DK, a half-wave plate 15 for adjusting the ratio of the reflected-light quantity and the transmitted-light quantity of a laser beam from non-read-out regions of the laser beam reflected from the beam splitter 12 at a polarizing beam splitter, a polarizing beam splitter 16 for passing therethrough only a polarized light having a predetermined polarization state and reflecting other lights, a first light-receiving element 17a for receiving the polarized light reflected from the polarizing beam splitter and outputting it as a first read-out signal R1, a second light-receiving element 17b for receiving a polarized light transmitted through the polarizing beam splitter 16 and outputting it as a second read-out signal R2, a reproducing circuit 18a containing a decoder, an amplifier, etc. for converting the read-out signal to a reproduced signal S and outputting the reproduced signal Sa, and a magnet MG1 for aligning the vertical magnetization direction of the optical disc DK in a predetermined direction.

Figure 18:
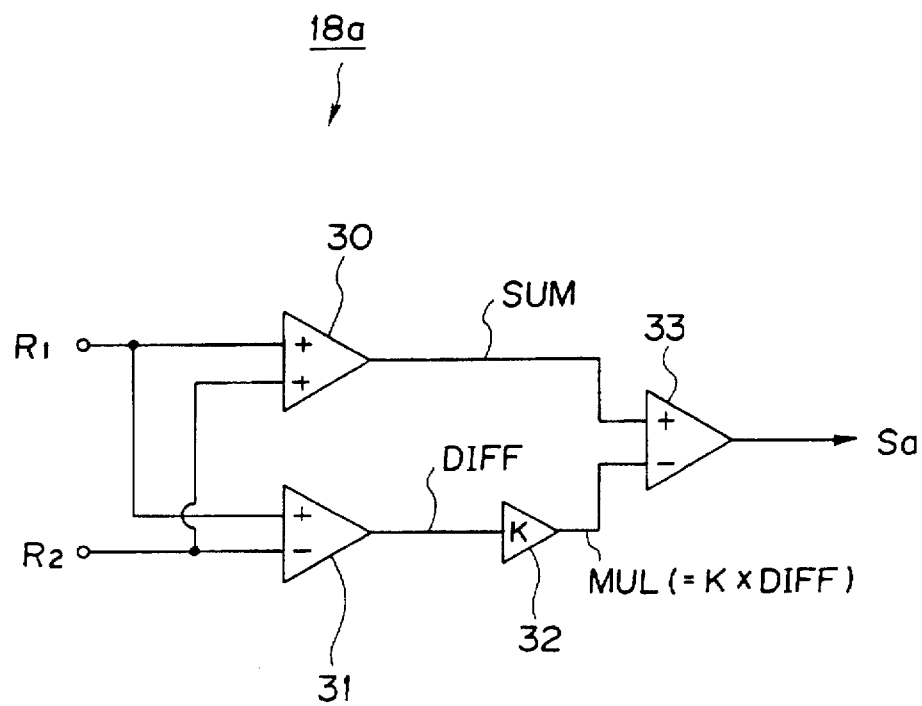
FIG. 18 is a schematic diagram showing the detailed construction of a reproducing circuit of the ninth embodiment.

FIG. 18 shows the construction of the main part of the reproducing circuit 18a.

The reproducing circuit 18a includes an adder 30 for receiving the first read-out signal R1 and the second read-out signal R2 to sum these signals and outputting the sum result as an added signal SUM (=R1+R2), a first subtracter for receiving the first and second read-out signals R1 and R2 to subtract the second read-out signal R2 from the first read-out signal R1 and outputting the subtraction result as a subtracted signal DIFF (=R1−R2), a multiplier 32 for multiplying the subtracted signal by a coefficient K (=1/tan $\theta_K$) and outputting it as a multiplied signal MUL(=K×DIFF), and a second subtracter 33 for subtracting the multiplied signal MUL from the added signal SUM to output a reproduced signal Sa.

Next, the operation will be described.

Figure 19:
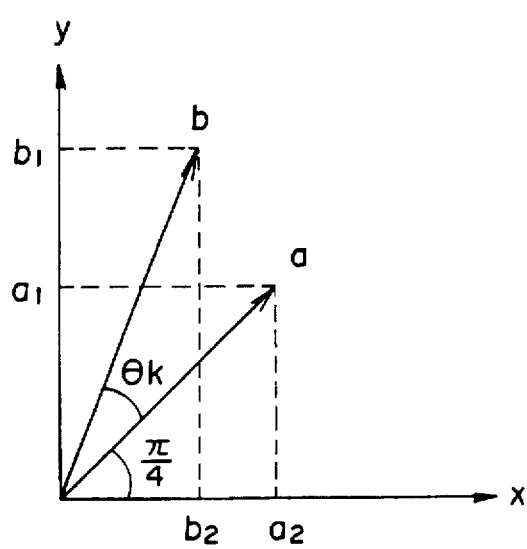
FIG. 19 is a schematic diagram showing the operation of the ninth embodiment.

As shown in FIG. 19, assuming that a vector indicating a component of the read-out signal (Kerr rotational angle=$\theta_K$) is a, a component of the vector a which is incident to the first light-receiving element 17a is $a_1$, a component of the vector a which is incident to the second light-receiving element 17b is $a_2$, a vector indicating a component of a signal to be masked (Kerr rotational angle=$\theta_K$) is b, a component of the vector b which is incident to the first light-receiving element 17a is $b_1$, and a component of the vector b which is incident to the second light-receiving element 17b is $b_2$, the following equation is satisfied:

$$R_1 = a_1 + b_1$$

$$R_2 = a_2 + b_2$$

$$a_1 = a_2 = a_3 (= \sqrt{2}/2 \times |a_1|).$$

Here, the added signal SUM and the subtracted signal DIFF are expressed as follows by using each component as described above:

$$\begin{aligned} SUM &= R_1 + R_2 \\ &= (a_1 + b_1) + (a_2 + b_2) \\ &= 2a_3 + b_1 + b_2 \\ DIFF &= R_1 - R_2 \\ &= (a_1 + b_1) - (a_2 + b_2) \\ &= b_1 - b_2. \end{aligned}$$

Here, defining the reproduced signal Sa as follows:

$$Sa = SUM - K \times DIFF,$$

the following equation is satisfied:

$$Sa = 2a_3 + b_1 + b_2 - K(b_1 - b_2).$$

The signal component to be read out is $2a_3$, and thus the constant K is determined so that the following equation is satisfied:

$$b_1 + b_2 - K(b_1 - b_2) = 0.$$

That is, $$K = (b_1 + b_2)/(b_1 - b_2). \quad (A)$$

As is apparent from FIG. 18, $$\tan(\theta_K + (\pi/4)) = b_1/b_2$$

$$b_1/b_2 = (1 + \tan \theta_K)/(1 - \tan \theta_K). \quad (B)$$

Accordingly, from the equations (A) and (B), $$K = 1/\tan \theta k. \quad (C)$$

Accordingly, if the reproducing operation is carried out using the reproducing circuit as shown in FIG. 18 on the basis of the coefficient K as represented by the equation (C), the recording information can be surely reproduced without inducing the cross-talk using the optical system of the conventional rewritable type of magneto-optical disc reproducing device.

In this case, as a method of optimizing the coefficient K, the following methods may be considered:

1) It is assumed that the variation in the optical disc is negligible, and that the Kerr rotational angle $\theta_K$ is beforehand measured to set the coefficient K;

2) Non-signal portions are provided at predetermined intervals in the optical disc, and the Kerr rotational angle $\theta_K$ is measured in synchronism with the non-signal portions to set the coefficient K; or 3) An auxiliary beam for measuring the Kerr rotational angle $\theta_K$ is provided separately from the beam for read-out, and the Kerr rotational angle $\theta_K$ is measured using the auxiliary beam to set the coefficient K.

In a case where $\theta_K$ is stressed by the optical system, it is necessary to add the coefficient K with this stressed component.

Tenth Embodiment

In the above described ninth embodiment, it is required that one of the reproduced light components has polarization state identical to that of the read-out light beam incident upon the optical disc, and that the temperature of in the area XAR is to be increased near the Curie temperature. Accordingly, due to the increasing temperature, the Kerr rotational angle $\theta_K$ is decreased and the efficiency of shielding (masking) performance may possibly be degraded. This tenth embodiment provides a reproducing device in which the polarization state of the reproduced light beam is not necessarily be identical to that of the read-out light beam and the efficiency of the shielding the mask area (e.g., area XAR, see. FIG. 4) can be increased.

Figure 20:
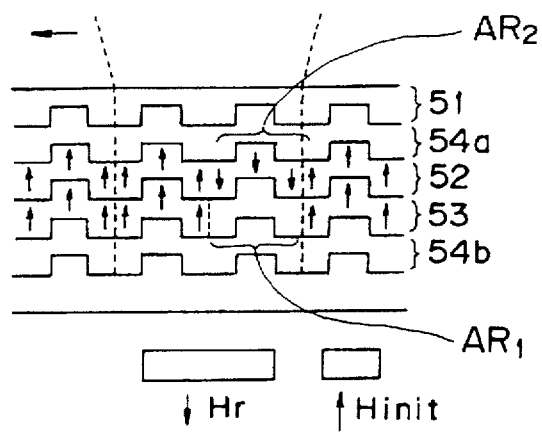
FIG. 20 is a cross-sectional view showing the detailed structure of an optical disc of a tenth embodiment.

FIG. 20 is a cross-sectional view of an optical disc. As shown in FIG. 20, the optical disc 50 includes a substrate 51 on which phase pits are formed, a reproduction layer 3 serving as a polarization state varying layer for rotating a polarization state of a linearly-polarized read-out light incident to the layer in accordance with a temperature distribution caused by the irradiation of the read-out light, a switching layer 53 being connectable with the reproduction layer 52 by a switched-connection in a normal temperature and magnetic domain thereof being extinguishable in a reproducing temperature, and protection layers 54a and 54b for protecting the reproduction layer 52 and the switching layer 53. In the following description, the combination of the reproduction layer 52, the switching layer 53, the protection layer 54a and the protection layer 54b is referred to as a magneto-optical layer.

More specifically, the optical disc 50 is so designed that an ZnS layer 54a serving as a dielectric protection layer, a GdFeCo layer 52 having magneto-optical effect, a TbFeCo layer 53 serving as a switching layer, and an ZnS layer 4b serving as a dielectric protection layer are formed on the substrate 51 in this order. In this case, the rotation of the polarization state is mainly caused by Kerr effect.

The reproducing principle of the magneto-optical disc in this embodiment will be next described.

In an initial state, the reproduction layer 52 and the switching layer 53 of the magneto-optical disc is magnetized by an initializing magnetic field $H_{init}$ produced by a magnetizing device such as a permanent magnet so that all regions of the reproduction layer 52 and the switching layer 53 have the same vertical magnetizing direction (upward direction in FIG. 20). In a reproducing operation, when a light spot whose read-out light intensity is adjusted is irradiated, the temperature of an area (e.g., the AR in FIGS. 5A and 5B) which is a part of a light spot is increased to the Curie temperature ($T_c$) or more, and the magnetic domain of the area is extinguished. At the same time, in a reproduction, the reproduction magnetic field $H_r$ (downward direction in FIG. 20) is produced. As a result, in a reproduction position of the reproduction layer 52 corresponding to the area AR in which the magnetic domain of the switching layer 53 is extinguished, the power of the switched connection is vanished and the natural coercive force of the reproduction layer itself appears. Therefore, the magnetization direction becomes downward direction. On the contrary, the magnetization direction of the reproduction layer 52 is kept upward in the area other than the reproduction position, and therefore the direction of the magnetic domain in the area XAR within the read-out light spot is upward direction. In this state, the rotational direction of the polarization state of the read-out light beam in the area AR is opposite to that in the area XAR. Therefore, angle difference of the polarization state of the reproducing light beam from the two areas are increased.

Figure 21:
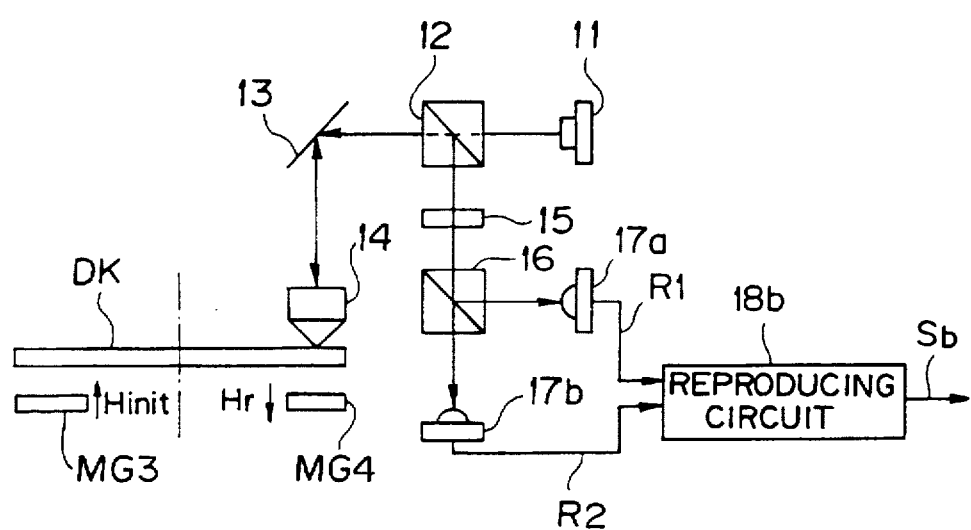
FIG. 21 is a schematic diagram showing the construction of a main portion of an optical disc reproducing device of the tenth embodiment.

FIG. 21 shows the construction of the main part of the optical disc reproducing device of the tenth embodiment.

As seen from FIG. 21, the optical disc reproducing device 10C differs from the device 10A shown in FIG. 15 in that the reproducing device 10C is provided with a reproducing circuit 18$b$ containing a decoder, an amplifier, etc. for converting the first read-out signal R1 and the second read-out signal R2 to a reproduced signal Sb and outputting the reproduced signal Sb, a magnet MG3 for aligning the vertical magnetization direction of the optical disc DK in a predetermined direction and producing a initialization magnetic field $H_{init}$, and a magnet MG4 for producing a reproduction magnetic field $H_r$. The components of the reproducing device 10C other than the above are identical to that of the device 10A, and hence the detailed description thereof will be omitted.

Figure 22:
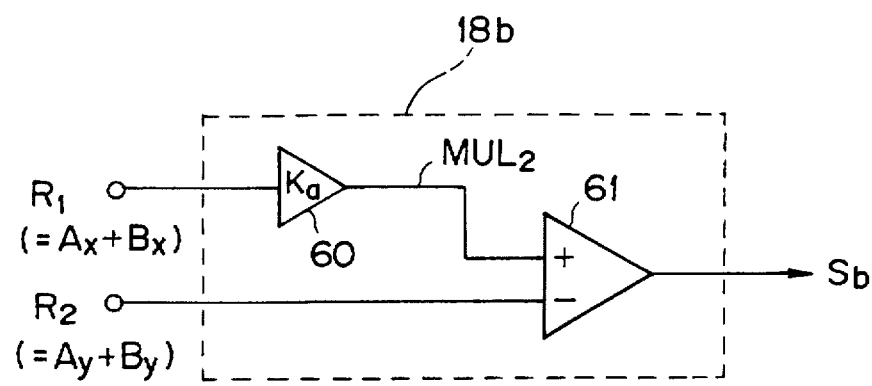
FIG. 22 is a schematic diagram showing the detailed construction of a reproducing circuit of the tenth embodiment.

FIG. 22 shows the construction of the main part of the reproducing circuit 18$b$.

The reproducing circuit 18$b$ includes a multiplier 60 for receiving the first read-out signal R1 and multiplying the first read-out signal R1 by a coefficient Ka to output it as a multiplied signal $MUL_2$, and a subtracter 61 for subtracting the second read-out signal R2 from the multiplied signal $MUL_2$ and outputting a reproduced signal Sb.

Next, the operation will be described.

Figure 23:
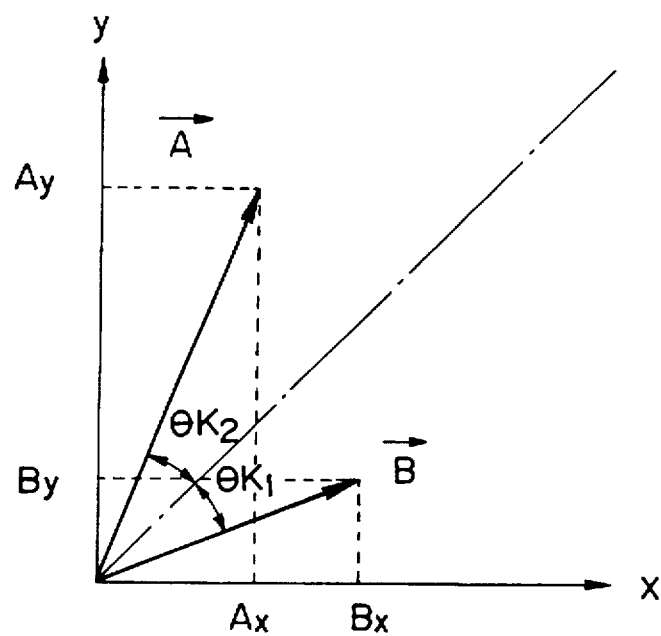
FIG. 23 is a schematic diagram showing the operation of the tenth embodiment.

As shown in FIG. 23, assuming that a vector indicating a component of a signal to be masked (Kerr rotational angle= $\theta_{K2}$) is A, a component of the vector A which is incident to the first light-receiving element 17$a$ is $A_x$, a component of the vector A which is incident to the second light-receiving element 17$b$ is $A_y$, a vector indicating a component of a signal to be read-out (Kerr rotational angle=$\theta_{K1}$) is B, a component of the vector A which is incident to the first light-receiving element 17$a$ is $B_x$, and a component of the vector a which is incident to the second light-receiving element 17$b$ is $B_x$, the following equation is satisfied:

$$R_1 = A_x + B_x$$

$$R_2 = A_{x'} + B_{x'}$$

Here, the multiplied signal $MUL_2$ and the reproduced signal $S_b$ are expressed as follows by using each component as described above:

$$MUL_2 = K_a \cdot R_1 \quad S_b = R_2 - R_1 \cdot K_a$$
$$= K_a \cdot (A_x + B_x) \quad = A_y - K_a \cdot A_x + B_y - K_a \cdot B_y.$$

Here, the signal component to be read out is $(A_y - K_a \cdot A_x)$ or $(B_y - K_a \cdot B_x)$. Therefore, if the constant K is determined so that the following equation is satisfied, the areas to be read-out (AR or XAR, see. FIGS. 5A and 5B) are replaced with each other:

$$B_y - K_a \cdot B_x = 0,$$

$$A_y - K_a \cdot A_x = 0.$$

More specifically, when information in the area AR is reproduced, the following condition should be kept:

$$A_y - K_a \cdot A_x = 0.$$

In this case, since the following equations stand ([A] indicates a vector A):

$$A_x = |[A]| \cos((\pi/4) + \theta_{K1})$$

$$A_y = |[A]| \sin((\pi/4) + \theta_{K1}),$$

the following equation is satisfied:

$$A_y - K_a \cdot A_x = |[A]| \sin((\pi/4) + \theta_{K1}) - K_a \cdot (|[A]| \cos((\pi/4) + \theta_{K1})) = 0.$$

Accordingly, the following equation is satisfied:

$$K_a = \tan((\pi/4) + \theta_{K1}) \tag{D}.$$

In the same manner, when information in the area XAR is reproduced, the following condition should be kept:

$$B_y - K_a \cdot B_x = 0.$$

In this case, since the following equations stand ([B] indicates a vector B), $$B_x = |[B]| \cos((\pi/4) - \theta_{K2})$$

$$B_y = |[B]| \sin((\pi/4) - \theta_{K2})$$

the following equation is satisfied:

$$B_y - K_a \cdot B_x = |[B]| \sin((\pi/4) - \theta_{K2}) -$$
$$K_a \cdot (|[B]| \cos((\pi/4) - \theta_{K2})) = 0.$$

Accordingly, the following equation is satisfied $$K_a = \tan((\pi/4) - \theta_{K2}) \tag{E}.$$

Accordingly, if the reproducing operation is carried out using the reproducing circuit as shown in FIG. 21 on the basis of the coefficient $K_a$ as represented by the equation (D) or (E), the recording information can be surely reproduced without inducing the cross-talk using the optical system of the conventional rewritable type of magneto-optical disc reproducing device.

In this case, as a method of optimizing the coefficient $K_a$, the following methods may be considered:

1) It is assumed that the variation in the optical disc is negligible, and that the Kerr rotational angle $\theta_{K1}$ (or $\theta_{K2}$) is beforehand measured to set the coefficient $K_a$;

2) Non-signal portions are provided at predetermined intervals in the optical disc, and the Kerr rotational angle $\theta_{K1}$ (or $\theta_{K2}$) is measured in synchronism with the non-signal portions to set the coefficient $K_a$; or 3) An auxiliary beam for measuring the Kerr rotational angle $\theta_{K1}$ (or $\theta_{K2}$) is provided separately from the beam for read-out, and the Kerr rotational angle $\theta_K$ is measured using the auxiliary beam to set the coefficient $K_a$. In a case where $\theta_{K1}$ (or $\theta_{K2}$) is stressed by the optical system, it is necessary to add the coefficient $K_a$ with this stressed component.

As described above, according to the tenth embodiment, it is not required that one of the reproduced light components has polarization state identical to that of the read-out light beam incident upon the disc. Further, according to the tenth embodiment, the angle difference of the polarization state between the masked area and the reproduced area can be increased and a material having high Curie temperature can be used as the reproduction layer. Therefore, the decreasing of the Kerr rotational angle $\theta_K$ due to temperature variation is minimized and shielding (masking) efficiency is highly improved.

Other Modifications

In the above embodiments, the magneto-optical recording material is used. However, this invention is not limited to the magneto-optical recording medium, and to any material (for example, photochromic material, etc.) insofar as the polarization state thereof is varied from its initial polarization state in accordance with the intensity of irradiated light or the temperature of the material layer.

Further, in the above embodiments, the laser beam emitted from the laser diode 11 is directly irradiated through the beam splitter 12, the mirror 13 and the objective lens 14 to the information recording surface of the optical disc DK. However, in order to improve linear polarization, a polarizing plate may be provided in an optical path between the laser diode 11 and the beam splitter 12 to irradiate the laser beam through the polarizing plate onto the optical disc DK.

Still further, in the above embodiments, the read-out light is assumed to be a linearly-polarized light. However, the construction as described above may be designed to meet an elliptically polarized light. In addition, the number of polarization states to be used is not limited to two, and the construction may be so designed to separate a reproducing light having one polarization state from reproducing lights having plural polarization states.

According to one aspect of this invention, the polarization-state varying layer varies the first polarization state of the reflected light or transmitted light of the first region within the read-out light spot on the information recording surface in accordance with the intensity distribution of the read-out light which is a linearly-polarized light irradiated from the external or the temperature distribution caused by the irradiation of the read-out light so that the first polarization state is different from the second polarization state of the reflected light or transmitted light of the second region which is another region within the read-out light spot.

Accordingly, information corresponding to the phase pits (recording information) which is recorded on only one of the first region and the second region within the read-out light spot on the information recording surface can be reproduced by receiving only one of the read-out light having the first polarization state and the read-out light having the second polarization state.

According to another aspect of this invention, the recording information contained in only one of the read-out light having the first polarization state from the first region and the read-out light having the second polarization state from the second region can be reproduced, each of the first and second regions being located a part within the read-out light spot. Therefore, when plural recording information exist in the read-out light spot, information having high space frequency can be reproduced.

What is claimed is:

1. An optical recording medium for use with a reproduction device having an objective lens with a numerical aperture NA and a light beam with a wavelength $\lambda$ comprising:

a substrate layer on which information is recorded as phase pits with a space frequency greater than $2NA/\lambda$; and a polarization-state varying layer for rotating a polarization state of the light beam when irradiated thereon in accordance with a temperature distribution of the irradiated light beam, wherein a magnetization state of said polarization-state varying layer varies in accordance with a temperature distribution during an irradiation of said light beam.

2. An optical recording medium according to claim 1, further comprising protection layers for protecting said polarization-state varying layer.

3. An optical recording medium according to claim 1, wherein the polarization state of the light beam is rotated by a magneto-optical effect.

4. An optical recording medium according to claim 1, further comprising a reflection layer.

5. An optical recording medium according to claim 1, wherein said polarization state varying layer comprises a Curie point recording material whose magnetic domain is extinguished at a temperature above the Curie temperature.

6. An optical recording medium according to claim 1, wherein said polarization state varying layer comprises a compensation point recording material whose coercive force increases at a compensation point temperature.

7. An optical recording medium according to claim 1, further comprising a magnetic field applying layer for directing the magnetizing direction of the polarization state varying layer in a single direction.

8. An optical recording medium according to claim 1, further comprising a switching layer coupled to the polarization state varying layer by an exchange-coupling at a temperature lower than a Curie point temperature and a magnetic domain of which is extinguished at a temperature above the Curie point temperature.

9. An optical recording medium according to claim 1, wherein said polarization-state varying layer receives the light beam and forms a first area and a second area having different magnetization states from each other within a portion of the polarization-state varying layer where the light beam is irradiated, said first area and said second area outputting portions of the received light beam as output light beams having different polarization-states from each other.

10. An optical recording medium according to claim 9, wherein said first area and said second area have the same magnetization state when the light beam is eliminated.

11. An optical recording medium according to claim 10, wherein said first area is a high temperature area and said second area is a low temperature area.

12. An optical recording medium for use with a reproduction device having an objective lens with a numerical aperture NA and a light beam with a wavelength $\lambda$ comprising:

a substrate layer on which information is recorded as phase pits with a space frequency greater than $2NA/\lambda$; and a polarization-state varying layer for rotating a polarization state of the light beam when irradiated thereon in accordance with an intensity distribution of the irradiated light beam, wherein a magnetization state of said polarization-state varying layer varies in accordance with an intensity distribution during an irradiation of said light beam.

13. An optical recording medium according to claim 12, further comprising protection layers for protecting said polarization-state varying layer.

14. An optical recording medium according to claim 12, wherein the polarization state of the light beam is rotated by a magneto-optical effect.

15. An optical recording medium according to claim 12, further comprising reflection layer.

16. An optical recording medium according to claim 12, wherein said polarization state varying layer comprises a Curie point recording material whose magnetic domain is extinguished at a temperature above the Curie temperature.

17. An optical recording medium according to claim 12, wherein said polarization state varying layer comprises a compensation point recording material whose coercive force increases at a compensation point temperature.

18. An optical recording medium according to claim 12, further comprising magnetic field applying layer for directing the magnetizing direction of the polarization state varying layer in a single direction.

19. An optical recording medium according to claim 12, further comprising a switching layer being coupled to the polarization state varying layer by an exchange-coupling at a temperature lower than a Curie point temperature and magnetic domain of which is extinguished at a temperature above the Curie point temperature.

20. An optical recording medium according to claim 12, wherein said polarization-state varying layer receives the light beam and forms a first area and a second area having different magnetization states from each other within a portion of the polarization-state varying layer where the light beam is irradiated, said first area and said second area outputting portions of the received light beam as output light beams having different polarization-states from each other.

21. An optical recording medium according to claim 20, wherein said first area and said second area have the same magnetization state when the light beam is eliminated.

22. An optical recording medium according to claim 21, wherein said first area is a high temperature area and said second area is a low temperature area.

* * * * *